United States Patent [19]

Spencer

[11] Patent Number: 4,482,891
[45] Date of Patent: Nov. 13, 1984

[54] ROBUST ELECTRONIC LIQUID LEVEL GAUGE

[76] Inventor: John D. Spencer, P.O. Box 2458, Dartmouth East Postal Station, Dartmouth, Nova Scotia, Canada, B2W 4A5

[21] Appl. No.: 304,157

[22] Filed: Sep. 21, 1981

[51] Int. Cl.³ ............................................. G08B 21/00
[52] U.S. Cl. .................................. 340/620; 73/304 C
[58] Field of Search ................... 340/620, 611, 870.32, 340/624, 625; 73/304 R, 304 C, 308, 313

[56] References Cited

U.S. PATENT DOCUMENTS

| | | | |
|---|---|---|---|
| 3,249,929 | 5/1966 | Sillers, Jr. | 340/663 |
| 3,301,056 | 1/1967 | Blanchard et al. | 73/304 C |
| 3,699,560 | 10/1972 | Meunier et al. | 340/611 |
| 3,868,663 | 2/1975 | Ray | 340/629 X |
| 3,935,739 | 2/1976 | Ells | 73/304 C |
| 3,978,464 | 8/1976 | Miesterfeld | 340/620 |
| 4,020,488 | 4/1977 | Martin et al. | 340/620 X |
| 4,228,427 | 10/1980 | Niedermeyer | 340/663 X |
| 4,371,790 | 2/1983 | Manning et al. | 340/620 X |

Primary Examiner—James Rowland
Assistant Examiner—Daniel Myer
Attorney, Agent, or Firm—Birch, Stewart, Kolasch & Birch

[57] ABSTRACT

A robust electronic liquid level gauge apparatus, particularly suitable for use with boiler drum water column, comprises simple probe sensors in the water column, differential amplifier sensors, detectors responsive only to the simultaneous presence of a minimum level signal and a certain frequency, and logic circuits continuously processing outputs from four detectors: its associated probe detector, the one below, and the two above.

10 Claims, 7 Drawing Figures

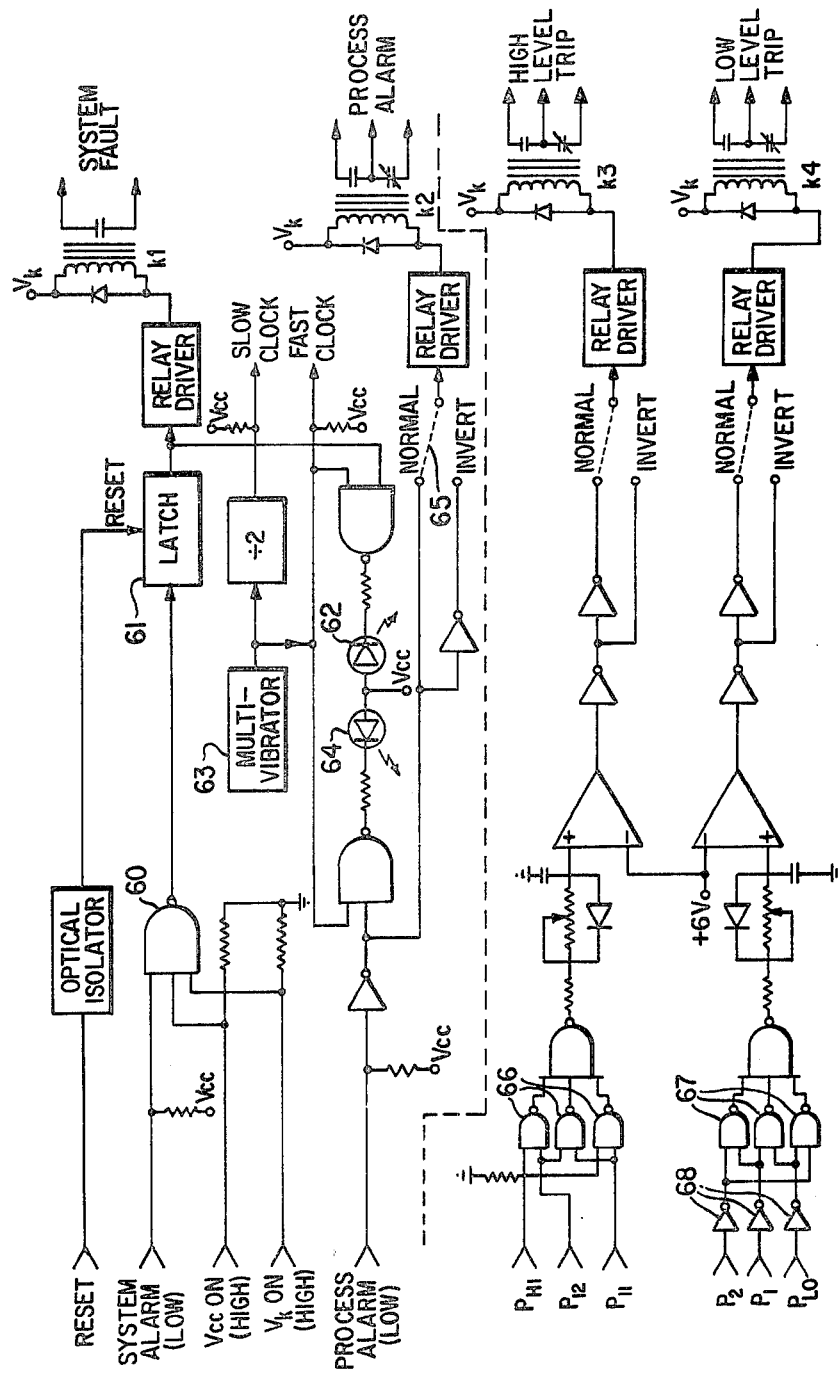

ROBUST ELECTRONIC LIQUID LEVEL GAUGE

FIELD OF THE INVENTION

The present invention relates to liquid level gauges in general, and to a boiler drum water/steam level gauge in particular. More particularly still, it relates to an electronic self-diagnosing system utilizing an oscillatory signal for sensing and detection of water and logic processing circuitry for continuously monitoring water sensing probes' outputs, and interpreting them to yield a continuous status display.

BACKGROUND OF THE INVENTION

Liquid level gauges have many applications. One such important, and exacting, application is the gauging of liquid level in a boiler drum. Exacting because the reliability requirements are understandably high.

Higher degrees of reliability are often achieved by means of systemic redundancy. For instance, in a paper entitled "Hydrastep—An Electronic Boiler Drum Water Level Gauge" by A. A. G. McInnes given at the Institution of Certificated Mechanical and Electrical Engineers, S.A. on Nov. 20, 1975, duplicate water columns and associated circuitry are utilized. Otherwise, the paper describes a gauging system using simple resistance measurement between a probe and the body of water in the container or column.

The system disclosed in U.S. Pat. No. 3,935,739, not being particularly concerned with high reliability, is for a liquid level gauge for monitoring the height of liquid in a storage tank. In the tank is submerged an upright conducting probe. Close to the probe is a series of electrodes along its length. The probe is excited by an a.c. voltage source, and each electrode is connected to one input of a digital comparator, the other input of which is connected to a reference voltage. The idea is that when fluid is intervening between the probe and an electrode, the mutual capacitance increases due to increased dielectric constant and thus also signal coupling.

U.S. Pat. No. 3,916,213 discloses a liquid level control system for sump pit and tank level control utilizing solid state sensing of conductive liquids. A pair of electrodes are disposed in the liquid at the two levels at which level control is desired. The electrical circuitry generates a high frequency signal from the power line frequency and the attenuation of the high frequency signal by the conductive liquid acts to energize circuits.

U.S. Pat. No. 4,099,167 discloses a system wherein electrodes are disposed on portions of a container comprising dielectric material. An electrical signal is capacitively transmitted between the electrodes, and the electrical signal is shunted by the presence of a liquid in close proximity to the electrodes. The shunting is detected.

U.S. Pat. No. 4,170,765 teaches a method and apparatus for indicating the level of liquid in a tank or the like whereby a transducer is mounted on a pipe above the liquid for producing, in response to a trigger signal, an ultrasonic pulse which is transmitted toward and reflected to the transducer first from a calibration target in the pipe above the liquid and then from the liquid so that the transducer produces echo pulses in response to receipt thereof. In one embodiment the calibration echo signal is applied to a logic circuit together with the output of a counter which is incremented to a predetermined count following the trigger signal by pulses from a voltage controlled oscillator so that the logic produces a control signal indicating the difference in time between when the calibration echo is received and when the counter reaches its predetermined count and which event occurs first. The logic then varies the frequency of the oscillator to reduce the difference. A further counter is enabled upon receipt of the calibration echo signal to accumulate a count of pulses from the oscillator and disabled upon receipt of the liquid echo signal so that the count indicates the liquid level.

U.S. Pat. No. 4,125,021 discloses apparatus for detection of the level of a liquid metal. The apparatus has a liquid level detecting probe provided with an exciting coil wound in a closed bottom non-magnetic sheath over the approximately whole length thereof, a level detecting coil wound in the sheath in an upper part thereof, and a temperature compensating coil wound in the sheath in a lower part thereof; a temperature control for maintaining the coils at a constant temperature; a drive circuit for supplying the exciting coil with an alternating current of a determined frequency and amplitude; and a signal processing circuit for subjecting output voltages induced in the liquid level detecting coil and in the temperature compensating coil to linear detection and then determining the ratio of the thus detected outputs, thereby detecting the level of the liquid metal. At the time of operation, the liquid level detecting probe is immersed in the liquid metal, the level of which is to be detected in such a manner that the temperature compensating coil is always located below the level of the liquid metal.

U.S. Pat. No. 3,918,035 teaches an indicating apparatus comprising a plurality of indicator lamps connected to respective outputs of a plurality of voltage comparators. The comparators have a first input connected to a common input supplied with an input voltage related to a quantity to be measured and a second input connected to respective reference voltages whereby such comparator energizes its respective lamp when the input voltage equals its respective reference voltage.

The above methods and apparatuses would not generally be suitable for applications requiring high reliability. This is in part due to excessive sensor complexity or that of the physical effect used for sensing, which may result in less robust systems, if not also expensive ones.

On the other hand, simple sensing and detection methods, such as mere reliance on galvanic resistance measurement, are prone to an uncertainty mitigated only by redundancy, again leading to increased cost.

SUMMARY OF THE INVENTION

A general object of the present invention is to provide robust liquid level gauge apparatus and system.

A further object is to provide apparatii capable of some degree of self-diagnosis in case of failure in failure prone components thereof.

Yet another object is to provide apparatii capable of utilizing simple sensing probes without sacrificing certainty of liquid detection, and without total redundancy.

An additional, specific, object is to provide such apparatus wherein the failure of sensor or detector result in a "no liquid" indication.

Another specific but important object of the present invention is to provide an apparatus, the components of which are continuously verifying each other.

These and other, more specific, objects are achieved by an apparatus having the following features.

For robustness, the apparatus utilizes simple, rugged single electrode probes well known in the art. Detection of liquid at the probe is only indicated after simultaneous presence of a minimum signal level and a single specific signal frequency.

Self-diagnosis and verification are achieved by having each probe verify its own indication versus that of the neighbour probes. Thus, while each probe has its own sensor and detector circuit, its logic circuit is shared and has additional inputs from the detector of the probe below as well as from the two probes above.

An interesting feature of the present invention, is the use of a differential or balanced sensor circuit, which does not yield any significant signal output regardless of the strength of stray signals, such as induced stray power at 60 Hz.

Thus, according to the present invention, there is provided an apparatus for sensing and indicating liquid level in a container comprising a plurality of electrical probe means each at a different level and each responsive to presence of liquid in its immediate vicinity, a plurality of sensing means one each responsive to one of the plurality of electrical probe means, a plurality of detector means one each responsive to one of the plurality of sensing means, and a plurality of logic means each responsive to at least two of the plurality of detector means for indicating the level of the liquid in the container.

According to another aspect of the present invention, there is provided apparatus for sensing and indicating the level of an electrically conductive liquid in a container, comprising a plurality of electrical probe means each at a different level and each responsive to electrical contact with liquid in the container, a plurality of electronic sensing means, each having a pair of differential inputs, one of which is coupled to respective one of the plurality of electrical probe means, and both of which are coupled to one of a pair of terminals providing a continuous oscillatory signal at a predetermined level and frequency, the other terminal of the pair of terminals being in electrical contact with the liquid in the container, and a plurality of detector means, each one responsive to one of the plurality of sensing means, comprising a signal level detector and a signal frequency detector, for providing an indication of the simultaneous presence of a signal at the predetermined frequency in excess of a preselected minimum level.

BRIEF DESCRIPTION OF THE DRAWINGS

A preferred embodiment of the present invention will now be described in conjunction with the attached drawings, in which:

FIG. 6 is a block schematic of the system monitor module shown in FIG. 2; and

DETAILED DESCRIPTION OF THE PREFERRED EMBODIMENTS

Figures 1, 7:
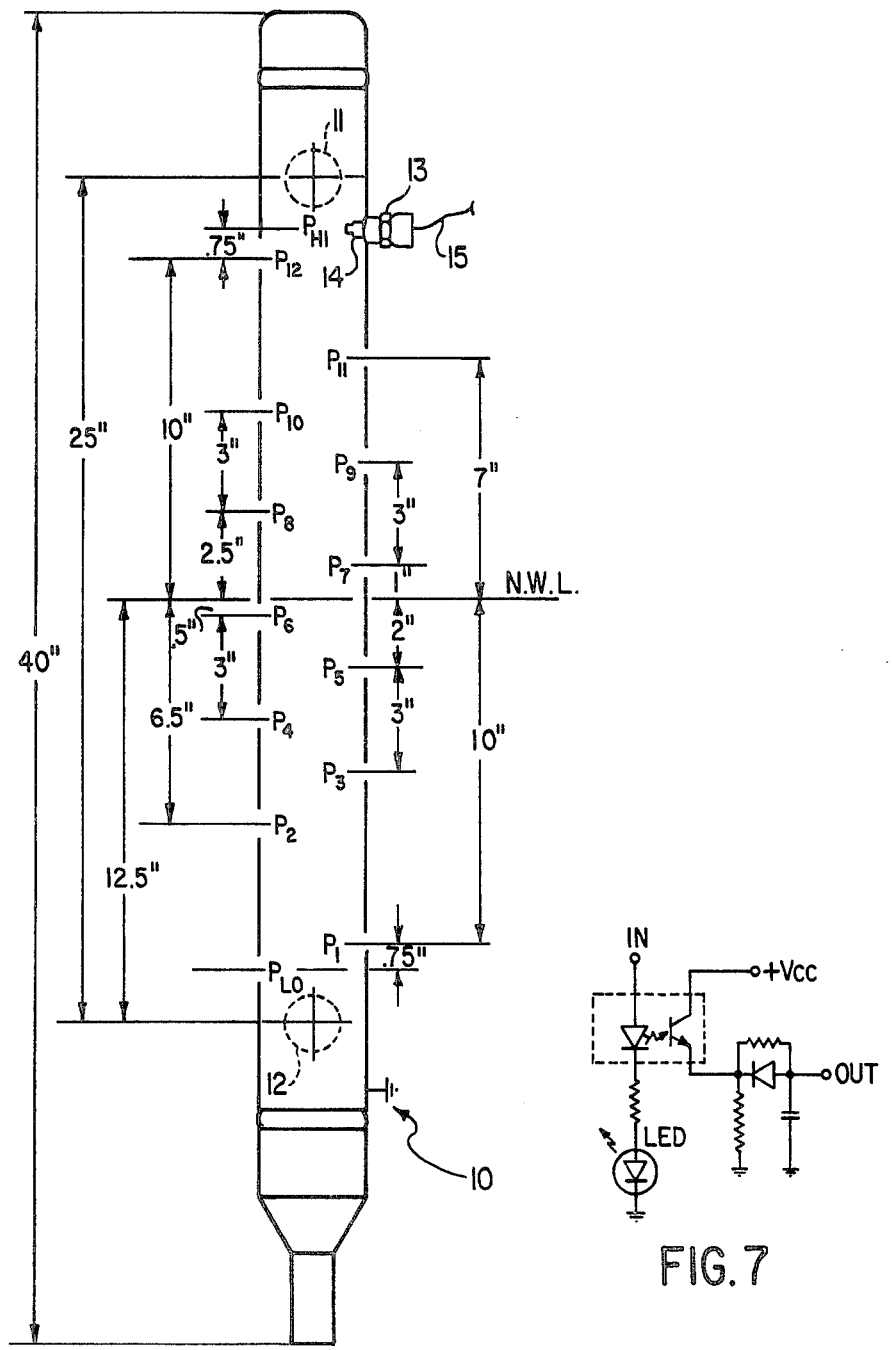
FIG. 1 is a representation of the water column of a boiler drum having probe positions at different vertical levels.
FIG. 7 is a circuit of a conventional optical insulator as used in FIG. 2.

FIG. 1 of the drawings illustrates a water column 10 of a drum boiler (not shown) connected and communicating therewith by means of openings 11 and 12. The water column 10 has a plurality of probes identical to screw-in probe 13 at probe positions $P_{LO}$, $P_1$ to $P_{12}$, and $P_{HI}$, $P_{LO}$ and $P_{HI}$ being the lowest and highest probe position, respectively. The total effective water column length, that between the openings 11 and 12 is 25 inches. The probe positions are distributed vertically between the openings 11 and 12, but crowd toward the center in order to permit more accurate gauging of the water level close to the normal water level (N.W.L.) in operation. The N.W.L. falls between the probes $P_6$ and $P_7$, which are 1.5 inches apart. For reliability of gauging and tripping, the two lowest and highest probes $P_{LO}/P_1$ and $P_{12}/P_{HI}$ are only 0.75 inches apart. All dimensions of the conventional water column 10 are in inches as shown in FIG. 1. Under normal operating conditions, the water column 10, the container, is filled with water up to N.W.L. and the top part above N.W.L. 13 filled with steam under pressure. Thus, the probes $P_{LO}$ and $P_1$ to $P_6$ have their electrode tips immersed in water, while the probes $P_7$ to $P_{12}$ and $P_{HI}$ have their electrodes exposed to steam. The probe 13, like the remainder of the probes, is preferably a probe such as that disclosed in the patent application by the same inventor entitled "Electrical Probe For Pressure Vessel" filed Sept. 21, 1983 and having Ser. No. 06/304,679. The electrode 14 of the probe 13 is electrically insulated from the body of the probe and is connected to outside apparatus by means of shielded field wiring lead 15. The probe body is in electrical contact with the column 10, which is grounded.

Figure 2:
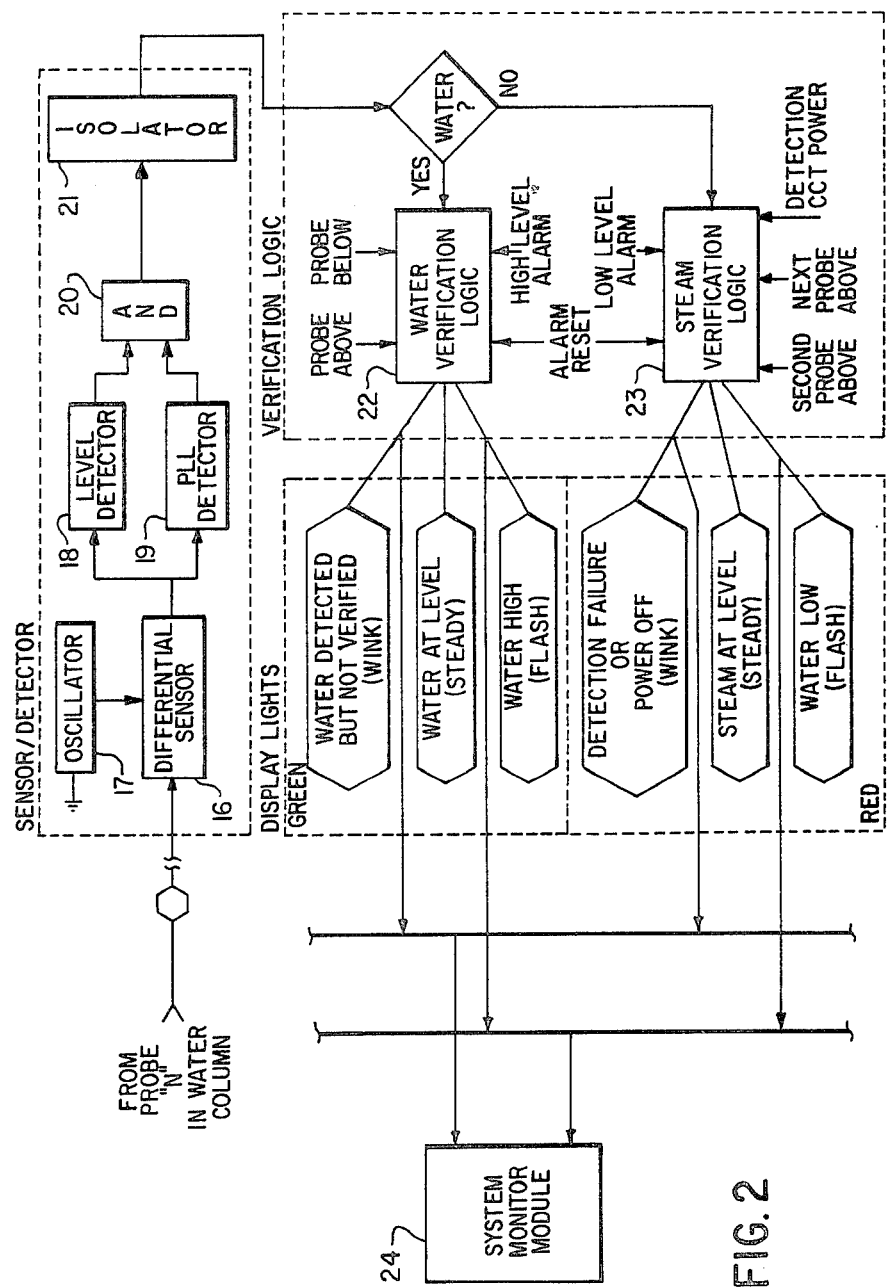
FIG. 2 is a block schematic of one of a plurality of identical sections of water level gauge apparatus according to the present invention having its input from a probe at position N in FIG. 1.

The electrode of each probe is connected to its own sensor/detector logic circuit shown in FIG. 2. The field wiring from any probe designated generally as N [with the probe below designated (N−1), the probe above designated (N+1), and so forth] is connected to an electronic differential sensor 16. A source of oscillatory signal 17, which in the present preferred embodiment simply is the power supply transformer, is resistively coupled to the differential input of the sensor 16. The other side of the source 17 is grounded, and is thus in contact with the water in the column 10. It is actually preferable to utilize a signal source supplying a signal having a frequency less than 60 Hertz, say, 20 Hertz. However, as a matter of convenience, and design choice, in the present preferred embodiment it was deemed that a 60 Hertz frequency is acceptable. The lower frequency decreases the likelihood of a false water indication at a probe above water due to the higher stray capacitive impedance between the probe electrode or interconnecting wiring and its surroundings.

The output from the differential sensor 16 is fed simultaneously to a level detector 18 and to a phase-lock loop (PLL) frequency detector 19. The level detector 18 yields a positive indication at its output only when a minimum a.c. signal level is exceeded, while the PLL detector 19 yields a positive indication at its output only when the 60 Hertz frequency appears at its input. Both outputs are subjected to conjunction in AND circuit 20, which causes the output of isolator 21 to go logically HIGH. The isolator 21 is shown in detail in FIG. 7, and is a conventional optical isolator, commercially available from general manufacturers.

As may be seen from FIG. 7, the output OUT of the isolator 21 is a low impedance logic, one (substantially +Vcc) impervious to interference, when water is sensed and detected at the probe N. The output OUT is supplied to a verification logic module associated with the probe N. Depending on the input test of whether water is detected or not, a different logic branch is activated. In case of YES, a water verification logic branch 22 considers the status of the lower probe (N−1), if any, as well as that of the probe above (N+1), if any. In addition, the circuit 22 also considers whether it has been programmed (by means of a simple logic HIGH or LOW input) to indicate a high water level alarm, and whether that alarm, if any, has been reset by the operator. Depending on these five logic input variables, one of three decisions is rendered and displayed by means of a green light which either winks, flashes or is steady. The decisions displayed are:

(1) Water is detected but not verified, if the probe above does not report water. Green light WINKS;
(2) Water is high, i.e., is detected at both N and N+1, and the circuit is set for high level alarm. Green light FLASHES; or
(3) Water is at level, when N and (N−1) indicate water, and the logic is not set for high level alarm. Green light is steady.

Similarly, logic branch 23 takes a "no water" decision at the probe N, as well as decisions from probes (N+1) and (N+2), and whether the logic is set for low level alarm indication (i.e., water is lower than it should be), in addition to an input from a simple sensor/detector power supply failure indicator (not shown) also relayed via an optical isolator similar to that of FIG. 7. The latter input is necessary, because an interruption of power to the sensor/detector would result in a "no water" or "steam" decision. Indeed, in the present preferred embodiment, this is the desired mode of system failure, as if also the case when the probe field wiring is interrupted. The logic branch 23 drives a red light display as illustrated in FIG. 2, similar to the green light indicator.

Each probe verification logic circuit controls its own pair of green/red indicator lights, so that at a glance the status of each probe is apparent. But in addition to such individual status indication, a system monitor module 24 is provided (shown in FIG. 6 in more detail), which processes the outputs from all probes' water and steam verification logic circuits (22 and 23) to trip (activate or deactivate) a relay indicating a SYSTEM ALARM condition in the case of a WINKING green or red indicator light, and to trip another relay indicating a PROCESS ALARM condition in the case of a FLASHING green or red indicator light. (Winking of the lights is provided by switching on/off at 2 Hertz, while in flashing, light is switched on/off at 1 Hertz.)

A system alarm means that there is likelihood of a malfunction of the electronic gauging apparatus, while a process alarm indicates likelihood of malfunction in the boiler process.

Figure 3:
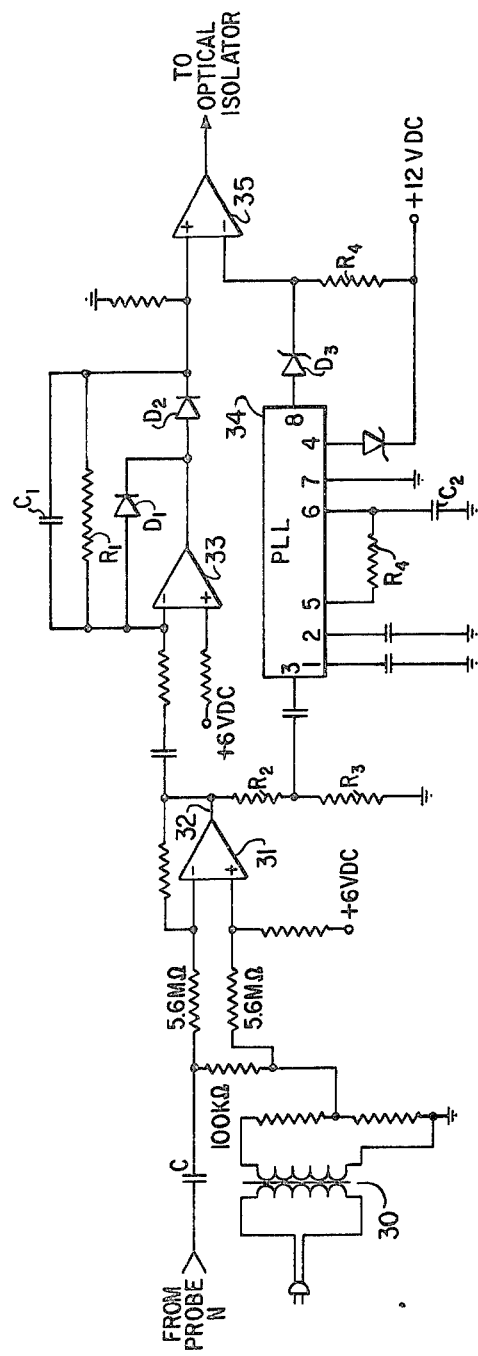
FIG. 3 is a schematic of the sensor/detector circuit shown in FIG. 2.

Turning now to FIG. 3, details of the sensor/detector circuits are shown. Power supply transformer 30, via a voltage divider, supplies a 12 volts 60 Hertz signal to the non-inverting input of differential operational amplifier 31 via a 5.6 Mohm resistor and to the inverting input in a 100 Kohm reference resistor in series with a second 5.6 Mohm resistor. DC blocking capacitor C connects the field wiring from probe N to the junction of the 100 Kohm resistor and the 5.6 Mohm resistor connected to the inverting input (−) of the operational amplifier 31. Since the 60 Hertz signals at the inputs of the amplifier 31 are in phase, no signal appears at its output 32, provided that the probe N is not connected to ground by being immersed in water. Should this be the case, or should it become the case, the amplifier 31 would cease to have the 60 Hertz signal at its inverting input, and the output 32 will deliver an amplified version of the signal at the non-inverting input. This amplified output signal is a.c. coupled to a peak detector circuit comprising an operational amplifier 33, diodes D1, D2, capacitor C1 and resistor R1. The output signal at 32 is divided by 20 via resistors R2 and R3 and a.c. coupled to a PLL (phase-lock loop) integrated circuit 34, the output of which, at pin 8, is applied via a zener diode $D_3$ to the inverting input of differential operational amplifier 35 (performing an AND function). The inverting input of that amplifier is also connected to the positive terminal of the 12 volt sensor/detector power supply via a resistor $R_4$. Thus, the inverting input of amplifier 35 has +12 volt unless the PLL 34 output, upon detection of the 60 Hertz signal at the output 32, causes the zener diode $D_3$ to break down and apply +6 volts to the inverting input of the amplifier 35. In which case, a positive or logic HIGH voltage would appear at the output of the amplifier 35 only if the non-inverting input to the amplifier 35 has a detected signal voltage higher than the voltage at the inverting input. Since the PLL 34 is a very selective (narrow band) frequency filter tuned to 60 Hertz (by means of $R_4$ and $C_2$), the signal detected at the output 32 must also be at the correct frequency for a positive indication of water detection to occur.

Figure 4:
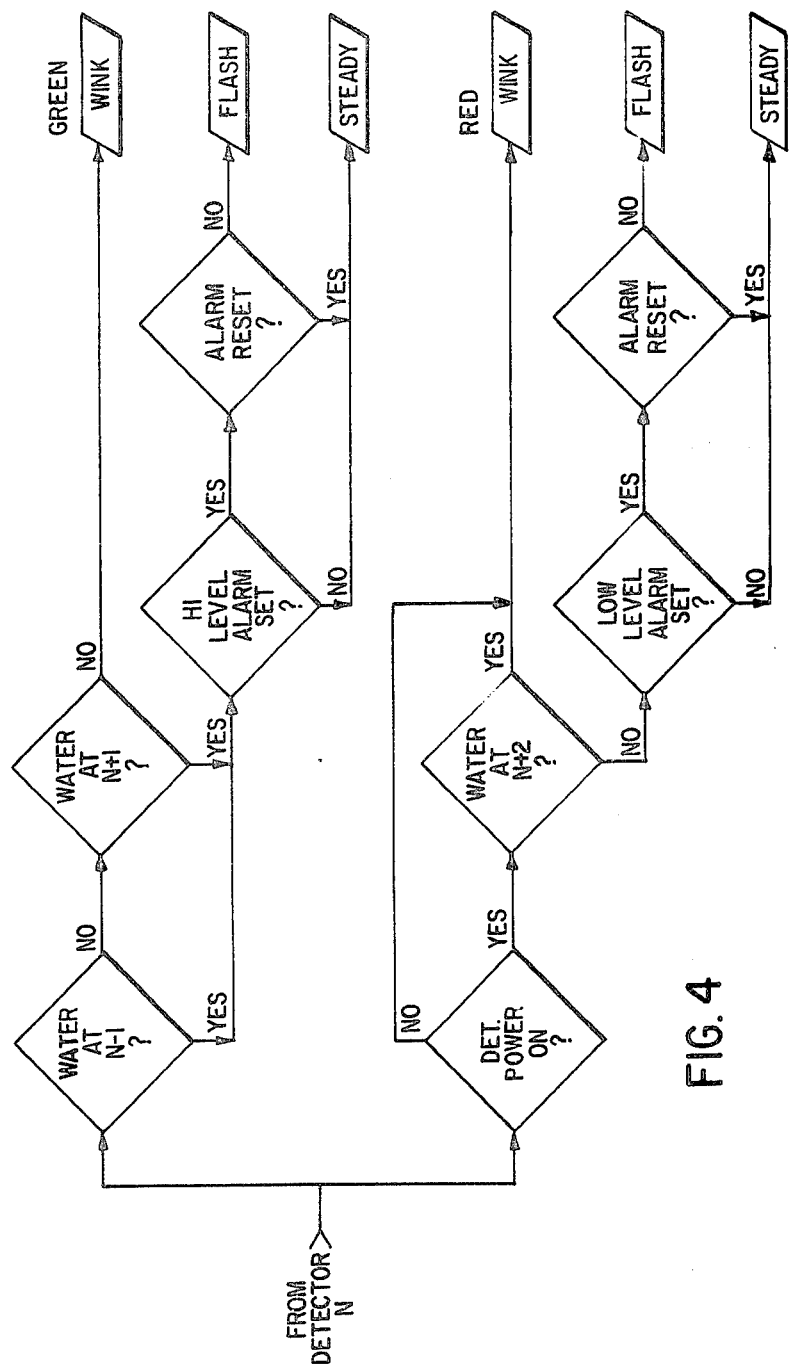
FIG. 4 is a flow-chart of the logic functions of the verification logic diagram shown in FIG. 2.

FIG. 4 of the drawings shows a flow-chart for the two logic branches 22 and 23. The flow-chart is self-explanatory, its hardwired realization is shown in FIG. 5, and utilizes NAND gates exclusively.

Figure 5:
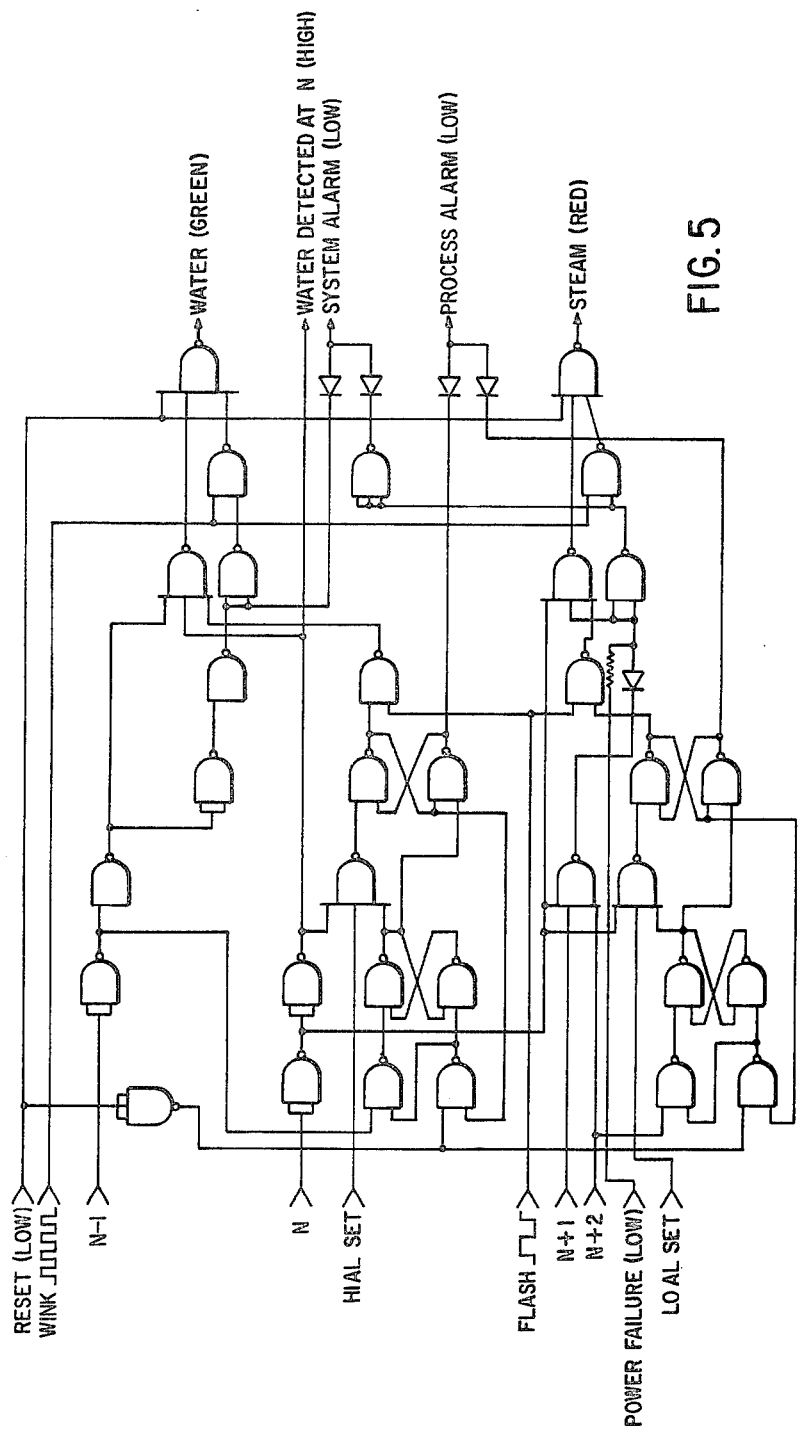
FIG. 5 is a detailed hardwired logic circuit realization of the flow-chart of FIG. 4.

In FIG. 5, the inputs are shown on the left-hand side, while the outputs are on the right-hand side. As mentioned above, the inputs to the $N^{th}$ logic circuit are:

(1) the $n^{th}$ sensor/detector via an optical isolator;
(2) the $(N-1)^{th}$ probe circuitry;
(3) the $(N+1)^{th}$ probe circuitry;
(4) the $(N+2)^{th}$ probe circuitry;
(5) the power supply interruption detector of the $N^{th}$ sensor/detector circuit via an optical isolator;
(6) the HI ALARM set switch (applying a logic 1);
(7) the LO ALARM set switch (applying a logic 1);
(8) the RESET momentary switch (applying a logic 0);
(9) the WINK signal at 2 Hertz; and
(10) the FLASH signal at 1 Hertz.

The WATER and STEAM outputs of the circuit of FIG. 5 drive the $N^{th}$ green and red lights (not shown), respectively. The outputs labelled SYSTEM ALARM and PROCESS ALARM are inputs to the system monitor module 24, shown in FIG. 6.

While the circuit of FIG. 5 is clear to those skilled in the logic design art, for the sake of explicitness, the following truth table for FIGS. 4 and 5 is given. It is understood, of course, that such logic flow-charts and functions may be realized in different ways. For instance, by means of memory look-up tables, or by means of microprocessors polling each sensor/detector in rapid sequence. While the latter solution may not be as reliable as hardwired logic, duplicate, or triplicate, processors could be used to enhance reliability. Such alternate realizations are equivalent to the preferred embodiments herein disclosed.

which goes HIGH at its output as any one or more of its inputs goes LOW, and while driving a latch 61 that, if triggered, causes relay R1 to close and make contact, indicating a system fault. The output of the latch 61 also

TRUTH TABLE

| N | N − 1 | N + 1 | N + 2 | Low Alarm | High Alarm | Detector Power | N Reset ? | Output Status | Alarm Condition |
|---|---|---|---|---|---|---|---|---|---|
| 0 | X | X | X | X | X | 0 | X | Detection Failure (Red Wink) | System |
| 0 | X | 1 | 1 | X | X | 1 | X | Detection Failure (Red Wink) | System |
| 0 | X | X | 0 | 0 | X | 1 | X | Steam at Level (Red) | — |
| 0 | X | 0 | X | 0 | X | 1 | X | Steam at Level (Red) | — |
| 0 | X | X | 0 | 1 | X | 1 | 0 | Steam at Level (Red Flash) | Process |
| 0 | X | 0 | X | 1 | X | 1 | 0 | Steam at Level (Red Flash) | Process |
| 0 | X | X | 0 | 1 | X | 1 | 1 | Steam at Level (Red) | — |
| 0 | X | 0 | X | 1 | X | 1 | 1 | Steam at Level (Red) | — |
| 1 | 0 | 0 | X | X | X | 1 | X | Detection Failure (Green Wink) | System |
| 1 | 1 | X | X | X | 0 | 1 | X | Water at Level (Green) | — |
| 1 | X | 1 | X | X | 0 | 1 | X | Water at Level (Green) | — |
| 1 | 1 | X | X | X | 1 | 1 | 0 | Water at Level (Green Flash) | Process |
| 1 | X | 1 | X | X | 1 | 1 | 0 | Water at Level (Green Flash) | Process |
| 1 | 1 | X | X | X | 1 | 1 | 1 | Water at Level (Green) | — |
| 1 | X | 1 | X | X | 1 | 1 | 1 | Water at Level (Green) | — |

In the above Truth Table:
N, N − 1, N + 1 and N + 2 indicate output of detectors associated with $N^{th}$, $(N − 1)^{th}$, $(N + 1)^{th}$ and $(N + 2)^{th}$ probe means, respectively, logic 1 meaning water detection at respective probe;
LOW ALARM = 1 means $N^{th}$ verification logic set for low water level alarm indication;
HIGH ALARM = 1 means $N^{th}$ verification logic set for high water level alarm indication;
DETECTOR POWER = 1 means power supply to detector is ON;
N RESET = 1 means $N^{th}$ verification logic has been reset after alarm indicating; and
X means status irrelevant.

Turning now to FIG. 6, the system monitor module is described. The function of this module is to sum-up the status of the total system, and to provide relay contacts that change status according to the system condition, in order that the system user may utilize these relay contacts to initiate whatever action is desired in response to such new condition.

The system monitor module accepts the pairs of outputs labelled SYSTEM ALARM and PROCESS ALARM from the logic verification circuits of the system, one of which is shown in detail in FIG. 5. These outputs are normally at a logical 1 or HIGH. In addition, the monitor module accepts inputs indicative of the condition of the system power supplies, which are normally at a logical 1 or HIGH. While only two such inputs are shown in FIG. 6, one for circuit power and one for relay power, it should be understood that at least duplicate power supplies should be provided for system reliability. A reset input is also provided to reset an alarm condition that has been triggered.

In the upper portion of block schematic of FIG. 6, the SYSTEM ALARM input, the circuit power Vcc status and the relay power Vcc status drive a NAND gate 60, causes LED indicator 62 to wink according to the fast clock of 2 Hertz generated in multivibrator 63. The output of fast clock (wink) generator 63 is divided by 2 and supplies the slow clock (flash). LED indicator 64 also winks in response to a LOW at the PROCESS ALARM input lead, which condition causes relay R2 to be activated (or deactivated depending on the position of jumper 65) and to make and break contacts as desired.

The lower portion of the circuit in FIG. 6 responds to extreme conditions in the water column 10, by processing the three highest and lowest sets of probe outputs. The outputs labelled WATER DETECTED AT N in FIG. 5 corresponding to the probes $P_{11}$, $P_{12}$ and $P_{HI}$ in the column 10 vote by means of the three NAND gates 66 and cause triggering (or detriggering) of High Level Trip relay R3 if two of the three probes report a water condition. Similarly, the outputs corresponding to the three lowest probes $P_{LO}$, $P_1$ and $P_2$ vote by means of three NAND gates 67 to cause triggering (or detriggering) of Low Level Trip relay R4 if two of the three probes cease (due to inverters 68) to report a water condition. Thus, also here the system failure mode is the "no-water" (or steam) condition.

What is claimed is:

1. Apparatus for sensing and indicating liquid level in a container, comprising:
   (a) a plurality of electrical probe means each at a different level and each responsive to presence of liquid in its immediate vicinity;
   (b) a plurality of sensing means, one each responsive to one of said plurality of electrical probe means, each comprising an operational amplifier having a pair of differential inputs and having a single one of said plurality of said electrical probe means coupled to a first of said pair of differential inputs;
   (c) a signal source supplying a detectable continuous signal having predetermined level and frequency to each probe means and to each sensing means, said continuous signal being applied in phase to a second of said pair of differential inputs of each of said sensing means, a common terminal of said signal source being in electrical contact with said liquid;
   (d) a plurality of detector means one each coupled to one of said plurality of sensing means, each detector means comprising a signal level detector and a frequency selective detector responsive to the predetermined frequency, each detector means yielding a logic signal only when both said signal level detector and said frequency selective detector detect signals; and
   (e) a plurality of logic means each sensing the logic signals supplied by two of said plurality of detector means to indicate presence of a logic signal corresponding to presence of liquid at two electrical probe means associated with said two of said plurality of detector means.

2. Apparatus as defined in claim 1, said single one of said plurality of said electrical probe means being capacitively coupled to said one of the differential inputs.

3. Apparatus as defined in claim 2, said predetermined frequency being less than 100 Hertz.

4. Apparatus as defined in claim 3, said continuous signal being oscillatory and having a detectable component at said predetermined frequency.

5. Apparatus as defined in claim 4, the logic means having display means for indicating one of normal and abnormal liquid levels depending on:
   (i) the output of the detector means;
   (ii) the setting of a high flow alarm input condition; and
   (iii) the output of at least one other detector means.

6. Apparatus as defined in claim 5, each of said plurality of probe means being an electrically conductive electrode exposed for direct contact with said liquid but is insulated from said container.

7. Apparatus as defined in claims 1 or 2, said liquid being water.

8. Apparatus as defined in claims 1 or 2, said liquid being water in a water level column of a boiler drum.

9. Apparatus as defined in claim 8, each of said plurality of detector means yielding an indication of liquid presence only when both said signal level detector and said frequency selective detector detect said continuous signal.

10. Apparatus as defined in claim 9, said frequency selective detector being a phase lock-loop type detector.

* * * * *